INVENTORS
Paul Waldvogel
Justus Babler
BY Pierce, Schiffler & Parker
ATTORNEYS

INVENTORS
Paul Waldvogel
Justus Babler
BY Pierce, Scheffler & Parker
ATTORNEYS

United States Patent Office 3,114,078

Patented Dec. 10, 1963

3,114,078

AMPLIFIER APPARATUS FOR MEASURING CURRENTS AND/OR VOLTAGES ON HIGH VOLTAGE TRANSMISSION LINES

Paul Waldvogel, Ennetbaden, and Justus Babler, Baden, Switzerland, assignors to Aktiengesellschaft Brown, Boveri & Cie, Baden, Switzerland, a joint-stock company Original application June 5, 1956, Ser. No. 589,483. Divided and this application Aug. 28, 1959, Ser. No. 836,654

4 Claims. (Cl. 317—9)

Figure 1:
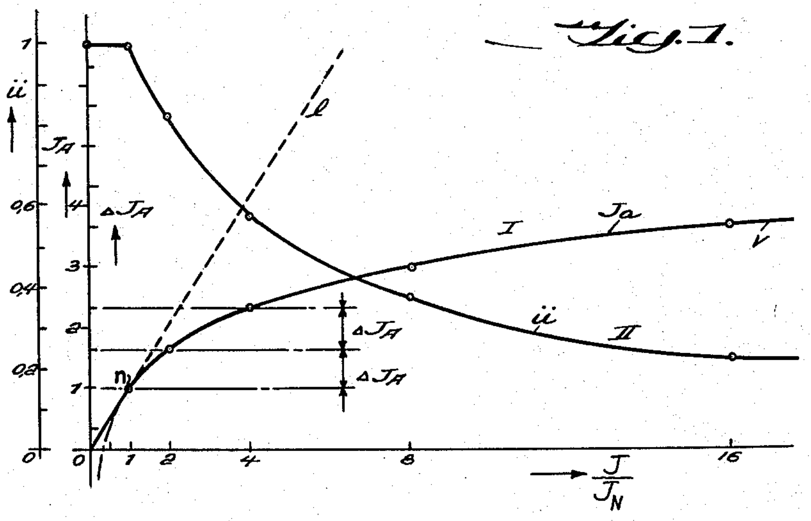

The present invention relates to amplifier apparatus for use in measuring curents and/or voltages in high voltage transmission lines and is a division of our co-pending application Serial No. 589,483, filed June 5, 1956.

In the field of protecting high voltage transmission systems against line faults, use of electronic equipment such as electron tubes, transistors etc. has become acceptable and this type of equipment has a special advantage of requiring a very low order of power for its operation. Also it has enabled the protective relay systems to operate with shorter tripping times. Moreover, moving parts are practically eliminated and the space requirement for the equipment is quite small.

Electronic equipment is essential when magnetic voltmeters are used as current transformers for the measurement of current in ultra high voltage transmission systems because in such case the coils of the transformers should carry practically no load. The reason for this lies in their great stray inductance, in contrast to conventional current transformers which must even carry load in their secondary winding. Consequently, when using magnetic voltmeters as the instrumentality for measuring line current, they must be connected to an electronic measuring amplifier with an input impedance as high as possible. The input stage of such measuring amplifiers is usually followed by further intermediate amplifier stages, as well as by an output power stage. The output power stage must exhibit the output power at rated current normal for measuring transformers. When utilizing the usual measuring and protective devices, this power output varies between twenty and forty volt-amperes. However, since the measuring transformers must transmit also short-circuit currents of at least twenty times the rated value, it follows that the output stage of the amplifier would have to be designed for a power equal to the square of the twenty-fold short circuit current, a power which, of course, would occur for only a very short operating time of less than one second. Such an amplifier, including its auxiliary voltage sources, could be provided only at a very high cost.

The object of the present invention is to provide an improved arrangement for the electronic amplifier equipment to the end that measured voltages and currents of the transmission line which lie within the range of normal load values are taken through the amplifier apparatus in a linear manner while other measured voltages and currents which lie in the range between normal load values and short-circuit condition are taken through the amplifier apparatus at reduced but proportional values, the reduction in amplitude increasing with increasing input amplitudes. In accordance with the invention, such reduction is carried out in a logarithmic manner.

The present invention thus relates to a measuring device using amplifiers for the evaluation of the currents and voltages measured, particularly in ultra high voltage systems where current transformers operating on the principle of magnetic voltmeters are used. The invention comprises an arrangement wherein the current transformer is followed by an amplifier which includes means whereby the amplification factor decreases with increasing amplitudes of the measured currents in such manner that the amplifier output current is proportional at least in a partial range of the currents to the logarithm of the primary current of the current transformer. The amplification factor or transmission of the amplifier may be maintained constant, for example, for current amplitudes of less than from one to two times the rated current value of the high voltage line being measured, and may be decreased in a logarithmic manner for currents of greater amplitudes up to the short-circuit values of from about ten to twenty times the rated current value. This results in the advantage that the output power of the amplifier can be reduced considerably, rendering possible substantial savings in cost at the output stage of the amplifier.

The invention also has additional advantages in that simplifications are achieved in the measuring and relay instruments because they can be designed for correspondingly smaller maximum currents. Instead of the generally linear measuring value distribution in the measuring and relay instruments there then exists percentage current proportions as a multiple of the rated line current. In the range of normal current loads on the line, i.e. below the rated load on the line, the indication is linear. Standard ammeters can be used. Also it becomes possible to take power readings from the amplifier apparatus.

The foregoing as well as other objects and advantages of the invention will become more apparent from the following detailed description of one embodiment of the invention and the accompanying drawings.

Figure 2A:
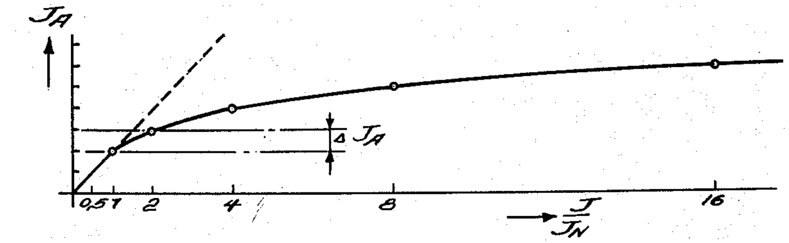
Figure 2B:
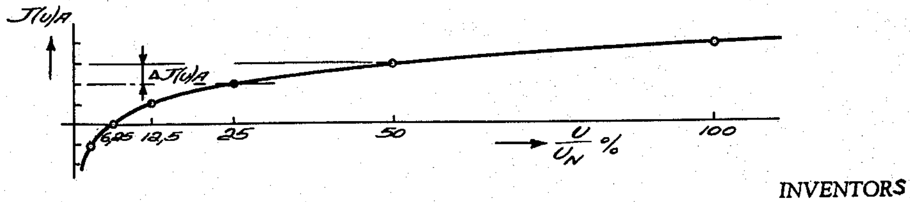
Figure 3:
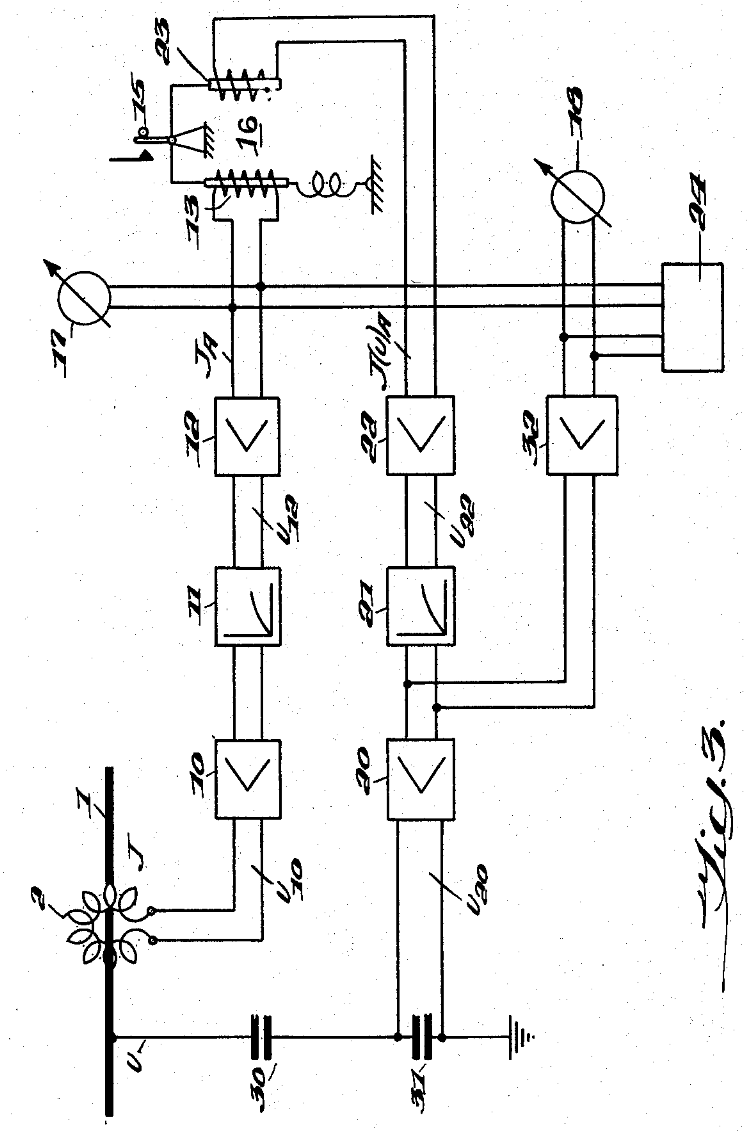

In these drawings,

FIG. 1 is a graph illustrating the characteristic of the amplifier as a function of line current;

FIGS. 2*a* and 2*b* are also graphs showing variation in current and voltage respectively; and FIG. 3 is a block schematic circuit diagram showing one practical embodiment of the invention.

With reference now to FIG. 1, curve I shows the variation in amplifier output current $J_A$ as a function of line current J. Up to the rated value of line current, i.e. from *o* to *n* on the curve the amplifier output current varies in a linear manner with the line current as indicated by the dashed straight line *l*. In the range above the rated value of line current, i.e. from *n* to *v* on the curve, the variation in amplifier output current with line current is logarithmic. For equal current proportions J there always correspond equal current differences $\Delta J_A$.

The transmission characteristic *ii* of the amplifier as a function of line current is shown by curve II. It will be seen that the characteristic *ii* is flat or constant from zero up to the rated value of the line current J and then decreases in a logarithmic manner for line currents in excess of the rated value.

The logarithmic variation in amplifier output current $J_A$ with the line current J can be used to advantage in line impedance measuring systems provided for distance protection. For this purpose, additional means are provided to transmit also the line voltage dependent upon the line current in such manner that at a given output, a voltage $U_A$ or a current $J_{(U)A}$ is furnished which, in the practically occurring voltage measuring range, varies in a logarithmic manner. At equal proportions of the voltage values there also result generally equal voltage or cvurrent differences $\Delta J_{(U)A}$ at the amplification output.

In FIGS. 2*a* and 2*b*, these proportions for current and voltage are compared. FIG. 2*a* again shows the current characteristic, and FIG. 2*b* shows the voltage characteristic in the range of the voltage decreases which appear when short-circuit occurs.

For the impedance $Z=U:J$, the difference $$J_{(U)A}-J_A=J_Z$$

is a measure of the impedance because $$\log Z=\log U-\log J$$

Correspondingly, the sum $J_{(U)A}+J_A=J_S$ would be a measure of the apparent power. The two currents are caused to act upon a differential relay which trips when going below or above the differential current $J_Z$ and hence the impedance value Z. The differential current $J_Z$ is then independent of the accidentally present magnitude of the voltage or current as long as these values are still within the logarithmic indication range.

Also, the switching moment of the differential relay, resulting from the respective differential current $J_Z$ is independent of these magnitudes. When the arrangement is used in a distance protection device, the current $J_Z$, or the switching moment of the relay, is a measure of the distance from the place on the transmission line where the failure occurred.

An embodiment of the invention as applied to an impedance relay system is shown in FIG. 3. There the measuring or secondary coil 2 inductively coupled to the high voltage power transmission line 1 produces a voltage which is proportioned to the line current and feeds the same to an electronic preamplifier unit 10. Connected to the output of the latter is an amplitude transforming unit 11 the function of which is to transform logarithmically the voltage which is applied to its input so that such voltage has a characteristic, for example, according to the curve in FIG. 2*a*. Thereafter, the voltage $U_{12}$ at the output of the transforming unit 11 varies proportionally to log $U_{10}$ and hence also proportionally to log J, namely, for the overcurrent range between the rated line current value $J_N$ and the maximum possible short-circuit current. For line currents below the rated value $J_N$ (*n* on the curve), the transmission is linear as previously explained in order that a conventional ammeter 17 and wattmeter 24 may be connected to the output amplifier 12 which follows the transforming unit 11. For impedance determination, in the event of a short-circuit, this linear lower current range is of no significance since in this case the currents are greater than the rated line current. To the output of the end amplifier 12 is also connected one coil 13 of the differential relay 16 which actuates the relay contacts 15.

The voltage U of the transmission line 1 is preferably reduced to a suitable input voltage $U_{20}$ of a preamplifier unit 20 by conventional means such as, for example, a capacitive voltage divider consisting of a plurality of condensers 30, 31 connected in series from the line 1 to ground, the input voltage $U_{20}$ being taken across condenser 31. The output of preamplifier 20 (which corresponds in function to preamplifier unit 10 for the line current) is applied to the input of an amplitude transforming unit 21 having a logarithmic transmission characteristic according, for example, to the curve of FIG. 2*b*, and the output from the transforming unit 21, i.e. voltage $U_{22}$, is applied to the input of an end or output amplifier unit 22 (which corresponds in function to output amplifier unit 12). To the output of the amplifier unit 22 is connected the other coil 23 of differential relay 16, and which acts in opposition to coil 13. By amplitude balancing, advantageously in the first amplifier stages 10 and 20 for the line current and voltage measurement, respectively, the tripping of relay 16 can be adjusted for a certain ratio $U:J$ or $\log U-\log J=J_{(U)A}-J_A$.

In order to read the line voltage, an output from the preamplifier unit 20 is taken to a further end amplifier unit 32 and the output from the latter is fed to a voltmeter 18 of conventional design and also to the voltage input of the wattmeter 24.

The amplitude transforming units 11 and 21 for the line current and voltage respectively, are preferably voltage dividers having current dependent resistances. For this are suitable opposed parallel-connected semi-conductor cells, e.g. cuprous oxide cells. By such means and by additional insertion of, and compensation by, correcting resistances, transmission characteristics according to FIG. 2*a* and FIG. 2*b* can be obtained with good approximation. In lieu of a purely resistive voltage divider, there can be used a voltage divider of the inductive type composed of choke coils, a longitudinal choke coil with an open core having predominately a constant inductivity, while a transverse choke coil presents a closed core whose inductivity decreases with increasing amplitude. In lieu of the longitudinal choke, one can use a resistance which is high in relation to the impedance of the iron-closed choke coil, e.g. the internal resistance of a pentode.

The amplitude transformation by means of the voltage divider involves somewhat of a distortion of the voltage curve. In the embodiment which uses current dependent resistances, the logarithmic voltage curve is somewhat flattened. In the embodiment which uses inductive chokes, the voltage curve is somewhat tapered. If a combination of the two types of voltage dividers are connected in series, compensation for the curve distortion is achieved and, at the same time, a lengthening of the modulation characteristic is obtained.

In the measuring amplifier, the preamplifier and the power or end amplifier units are each separately provided with negative feedback so as to be practically independent of fluctuations in the operating voltages and also independent of tube aging. Moreover, the end stage must be independent of load from the connected measuring instruments and relays. For this purpose, the end stage is provided, in addition to negative feedback, which reduces the internal resistance, with a current feedback. The current feedback enables the internal resistance of the amplifier stage including the output transformer to be compensated to zero.

We claim:

1. Apparatus for measuring current flow in a high voltage power line comprising a current transformer coupled to said line, said transformer being of the magnetic voltmeter type, amplifier means connected to said transformer, said amplifier means having a high input impedance and a gain characteristic which is constant for a lower range of input current values up to at least the rated value of line current and thereafter decreases logarithmically, and supervisory relay means connected to the output of said amplifier means.

2. Voltage and current measuring apparatus for use in conjunction with a high voltage power line comprising a current transformer coupled to said line, said transformer being of the magnetic voltmeter type, a first amplifier connected to said transformer, said amplifier having a high input impedance and a gain characteristic which is constant for a lower range of input current values up to at least the rated value of line current and thereafter decreases logarithmically, a voltage divider connected to said power line from which a measurement of the line voltage is taken, a second amplifier connected to the measured voltage, said second amplifier having a high input impedance and a gain characteristic which is constant for a lower range of input voltage values up to at least the rated line voltage and thereafter decreases logarithmically, and supervisory relay means responsive jointly to the outputs from said first and second amplifiers.

3. Apparatus as defined in cliam 2 wherein said first and second amplifiers each include a pre-emplifier stage having a high input impedance and a constant gain charactereristic, an intermediate amplifier stage having a combined constant and logarithmic gain characteristic, and an output power stage with a constant gain characteristic.

4. Apparatus as defined in claim 1 wherein said amplifier means includes a pre-amplifier stage having a high input impedance and constant gain characteristic, an intermediate amplifier stage having a combined constant and logarithmic gain characteristic, and an output power stage with a constant gain characteristic.

References Cited in the file of this patent

UNITED STATES PATENTS

| | | |
|---|---|---|
| 1,714,675 | Koppitz | May 28, 1929 |
| 1,883,613 | Devol | Oct. 18, 1932 |
| 2,241,127 | Harder | May 6, 1941 |
| 2,284,423 | Hansell | May 26, 1942 |
| 2,425,759 | Sonnemann | Aug. 19, 1947 |
| 2,457,214 | Doll | Dec. 28, 1948 |
| 2,594,022 | Horton | Apr. 22, 1952 |
| 2,845,581 | Hodges | July 29, 1958 |
| 2,920,242 | Koss | Jan. 5, 1960 |

OTHER REFERENCES

Audio Engineering, November 1949, pages 22, 23 and 24.